Figure 1:
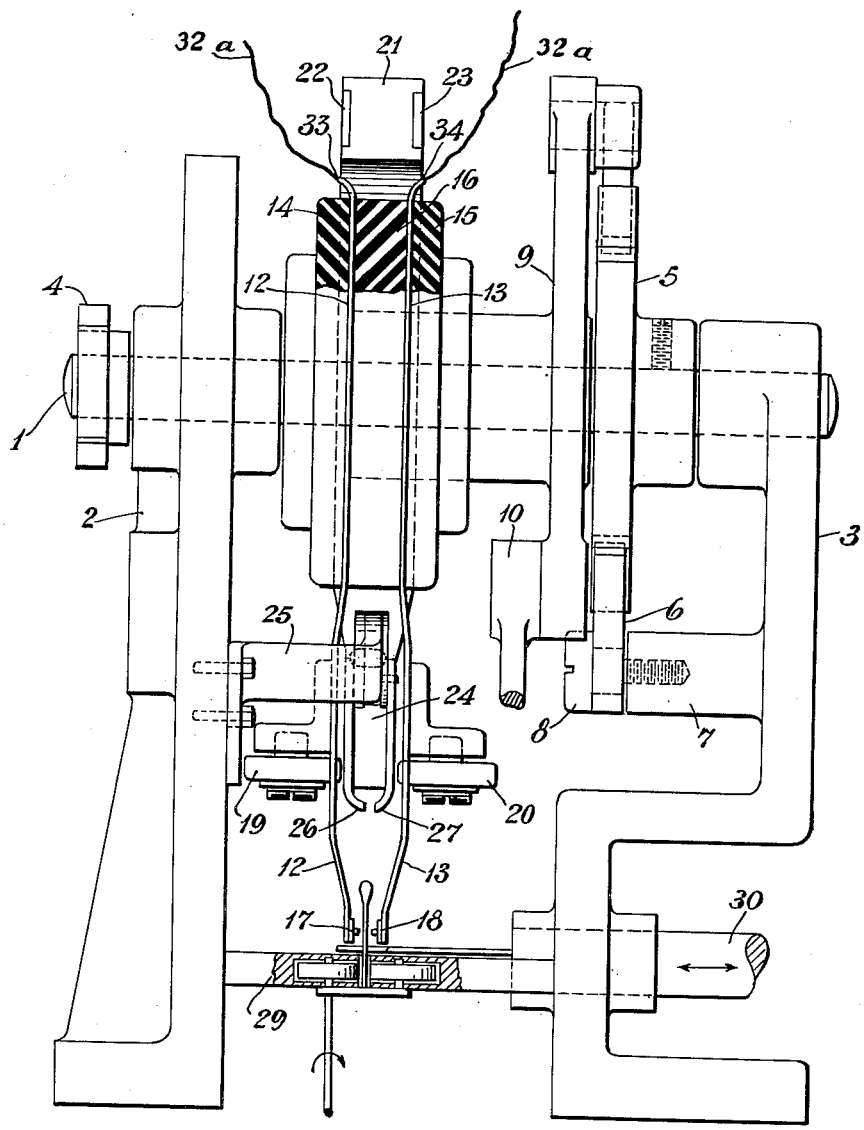

Donald George Ashcroft, INVENTOR

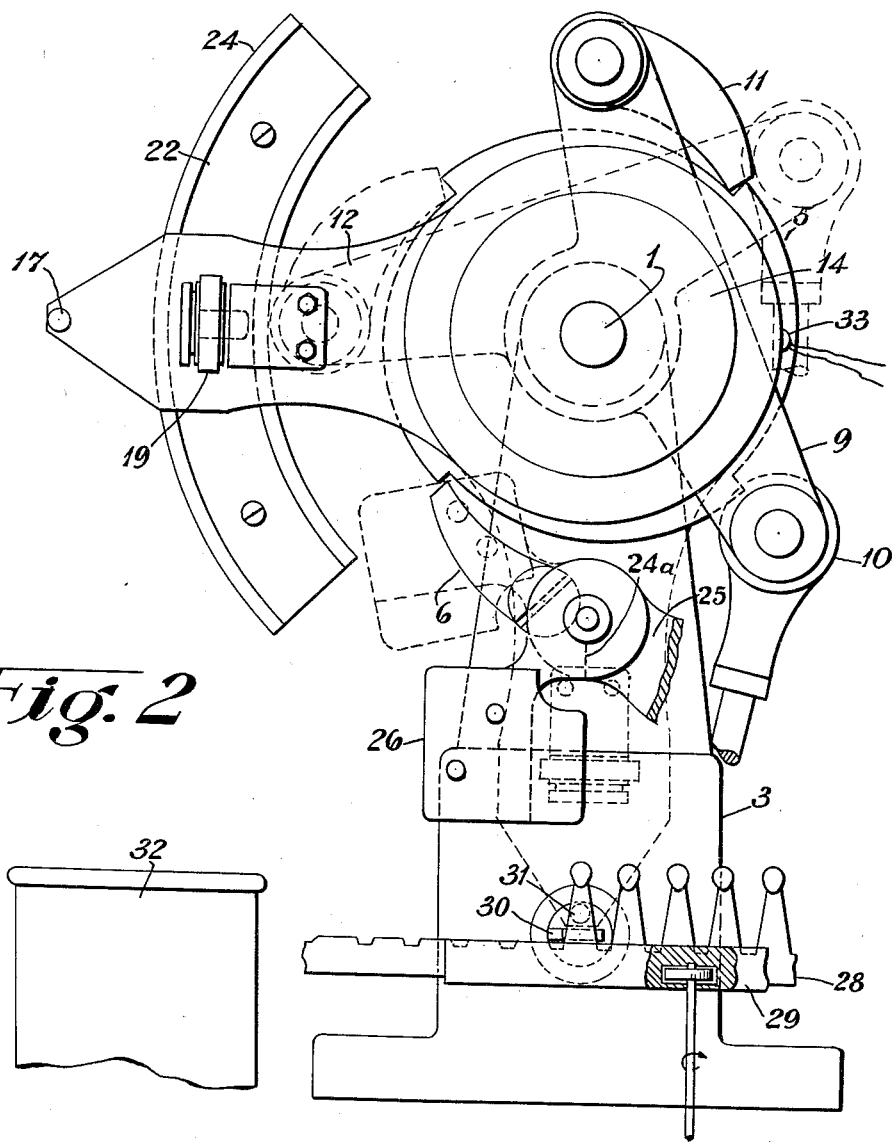

Patented Aug. 24, 1943

2,327,484

UNITED STATES PATENT OFFICE 2,327,484

APPARATUS FOR GRADING ELECTRICAL RESISTANCES AND ARTICLES COMPRISING THEM

Donald George Ashcroft, Saltcoats, Scotland, assignor to Imperial Chemical Industries Limited, a corporation of Great Britain Application August 31, 1940, Serial No. 354,991
In Great Britain October 17, 1939

1 Claim. (Cl. 209—81).

The present invention relates to the grading or classification by electrical resistance of articles produced by repetitive manufacturing processes. The invention relates particularly to the manufacture and grading of low-tension and high-tension fuzeheads; and is a modification of the invention described and claimed in British Patent No. 494,103.

In the said specification I have described and claimed an apparatus for the grading or classification of articles consisting of or comprising an electrical resistance element, including means for supplying to a working position a continuous series of such artitcles; means for separating each article in succession from the series at the working position; means for transporting each separate article from the working position and releasing it at an adjacent release position; means for applying a testing voltage across each resistance element at some period during its transport from the working position to the release position; means, operated by the current passing through the resistance element during the application of the testing voltage, for selecting and energising an electrical circuit according to the magnitude of the said current; means operated by the said circuit for directing the released article into a collector corresponding to the said circuit; and means for reopening the said circuit after discharge of the article into the collector and before the separation and transport of the next article in the series. The means of transporting and releasing the article, as described and claimed in British Patent No. 494,103, comprise a fixed annular cam bearing on the opposed pairs of arms of two insulated rotatable metal spiders so that the tips of opposed pairs are normally maintained out of contact with one another except during their travel over the sector corresponding to their travel between the working position and the release position.

In the apparatus modified according to the present invention, the annular cam and rotating spiders are replaced by a single pair of reciprocating spring fingers, to which the testing voltage is led without utilising any sliding contacts, and a cam or cams, which coact with the fingers so that these close on and hold each article to be transported, transport it, and then open to release it.

One simple arrangement of cams comprises two cams, one of these being a fixed cam, in the shape of a quadrant arranged to spread the spring fingers apart at the release position, while the other is capable of moving in and out of its working position so that, when the fingers are moving towards the article to be picked up, the cam is in its working position and spreads the fingers, which on moving past it close on the article. When the fingers are moving in the reverse direction, that is, when they are transporting the article, this cam moves out of its working position and so does not spread the fingers.

A convenient modification of this arrangement of cams is to permit the movable cam when it moves out of the working position at the "pick up" point, to move into the position which in the first arrangement was occupied by the fixed cam. This enables the fixed cam to be dispensed with. This invention diminishes the bulk of the apparatus and it is simplified and more convenient in operation.

A further advantage of this construction is that an increased accuracy of measurement is obtained by the use of fixed contacts in place of the sliding contacts described in British Patent No. 494,103.

The drawings illustrate a form of apparatus constructed according to the present invention. Fig. 1 is a view in elevation from the feed side, and Fig. 2 is a side elevation of the apparatus as seen from the left-hand side of Fig. 1; the frame casting on that side being removed to show the arrangement of the parts. The parts are shown in a different position in Figure 2 as compared with Figure 1.

In Fig. 1, shaft 1 is journalled in frame castings 2, 3. A four-lift contact-breaker cam 4 is fixed to one end of the shaft, and serves the same purpose as part 21 in British Patent No. 494,103. A four-step ratchet wheel 5 is fixed to the other end of the shaft, and rotates with it during the operation of the machine in a clockwise direction as seen from the contact-breaker end. Rotation of the shaft in the opposite sense is prevented by a pawl 6 mounted on a pillar 7 on frame casting 3 and retained by screw 8. Between frame casting 3 and the ratchet wheel, a rocker-arm 9 is mounted freely on the shaft. One side of this rocker-arm is coupled to a connecting rod 10, which reciprocates between the extreme positions shown in Figs. 1 and 2 respectively. The other side of the rocker-arm carries a pawl 11, which engages the steps of the ratchet wheel. An extension of the rocker-arm bearing carries the transporting and test-voltage-application device, which in this apparatus comprises two metal plates 12, 13, mounted on and insulated from the apparatus by mouldings 14, 15 and 16. These plates extend to form a pair of spring fingers carrying contact pins 17, 18 and ball-bearing rollers 19, 20. These rollers protrude through slots in the spring fingers, and serve to reduce the resistance to motion of the fingers over the cam devices used to open the fingers at the appropriate positions on their travel.

These cam devices consist of, firstly, a fixed quadrant 21 of electrically-insulating material, with inset metal tracks 22, 23 for the rollers; and, secondly, a cam block 24 pivoted on a bracket 25 on end frame 2. The separation of the quadrant tracks increases from the lower end, so that the contact pins are separated at the desired position as the rollers travel along the tracks. The cam block rests normally as shown in Fig. 2 against a stop 24a on its bracket, but is free to rotate approximately one-quarter turn clockwise round its pivot from the position shown. The block is provided with metal side-plates 26, 27 over which the rollers run during the return motion of the spring fingers.

The fuzeheads are fed to the machine in a series of combs 28 propelled along a slot in the base plate 29 to a combined stop and cutter device similar to part 8 of British Patent No. 494,103.

The machine operates in the following manner. In the position shown in Fig. 1, a fuzehead 31 is at the working position against the stop of the cutting device 30, and the cutter is about to sever it from the comb. The rollers are about to ride off the side-plates at the rear end of the cam block, so that the contact pins on the spring fingers will close together. As the connecting rod 10 reaches the upward limit of its travel, the fuzehead is severed and simultaneously gripped between the contact pins. As the connecting rod commences its return motion, pawl 11, being engaged in a step of the ratchet wheel, rotates the shaft and with it the rocker arm and spring fingers.

The rotation of the shaft causes the contact breaker to close the testing circuit 32a and apply the testing voltage to terminals 33, 34 on the insulated plates, and thence through the spring fingers and contact pins to the fuzehead.

As the fingers gripping the severed fuzehead move from the working position, the rollers bear on the rear of the cam block, causing it to rotate round its pivot, ride over the rollers, and drop down to its normal position behind them. In this way the spring fingers are not separated by the cam block on their forward and upward movement.

As the rotation of the shaft and fingers continues, the rollers reach their tracks on the quadrant. Meanwhile the testing apparatus has energised a collector, not shown, selected according to the magnitude of the current passed through the fuzehead by the testing voltage. As the rollers ride over the thicker part of the quadrant, the spring fingers are forced apart, and the fuzehead drops down the chute 32 to the collector. The connecting rod now reaches the downward limit of its motion, and pawl 6 rides over and engages in a step of the ratchet wheel, locking the shaft against rotation in the opposite sense. The contact-breaker also cuts off the testing voltage and resets all circuits to the zero position.

On the return motion of the connecting rod 10, the shaft 1 and its attachments remain stationary. The cutter 30 is withdrawn, so that the next fuzehead is freed to move up to the working position against the stop.

The spring fingers continue their downward motion, and the rollers on leaving the quadrant tracks strike the front end of the cam block. As the cam block is now supported by its bracket, the rollers are forced apart, and ride over the side-plates and close behind them, thus causing the contact pins to open and then close on the fuzehead at the working position. Simultaneously, pawl 11 rides over and engages in a step of the ratchet wheel in readiness to recommence the cycle.

The operation of subsidiary parts of the apparatus, such as for example the fuzehead cutter or the collecting devices, may be carried out as described in British Patent No. 494,103.

Having now particularly described and ascertained the nature of my said invention and in what manner the same is to be performed I declare that what I claim is:

Apparatus for the grading of articles comprising an electrical resistance element, including means for supplying to a working position a continuous series of such articles; means for separating each article in succession from the series at the working position; means for transporting each separate article from the working position and releasing it at an adjacent release position; means for applying a testing voltage across each resistance element at some period during its transport from the working position to the release position; means operated by the current passing through the resistance element during the application of the testing voltage for directing the released article into a chute, said means for transporting and releasing the separate articles to be graded and classified comprising a pair of reciprocating fingers to which the testing voltage is led free from sliding contacts, cam means comprising a portion coacting with said fingers to open the same and then to release the same so as to close upon an article to hold it, said cam means also comprising a portion for opening the fingers to release the article after the same has been transported to release position, said first mentioned portion being adapted to be actuated out of operative position by said transporting means while transporting the article to release position.

DONALD G. ASHCROFT.